(12) United States Patent
Seo et al.

(10) Patent No.: US 8,435,151 B2
(45) Date of Patent: May 7, 2013

(54) GEAR TRAIN OF AUTOMATIC TRANSMISSION FOR VEHICLES

(75) Inventors: Kangsoo Seo, Suwon-si (KR); Seong Wook Hwang, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 247 days.

(21) Appl. No.: 12/958,122

(22) Filed: Dec. 1, 2010

(65) Prior Publication Data

US 2012/0004066 A1 Jan. 5, 2012

(30) Foreign Application Priority Data

Jun. 30, 2010 (KR) .................. 10-2010-0063167

(51) Int. Cl.
*F16H 3/62* (2006.01)
(52) U.S. Cl.
USPC .................................... 475/271; 475/275
(58) Field of Classification Search ............ 475/271, 475/275
See application file for complete search history.

(56) References Cited

U.S. PATENT DOCUMENTS

| | | | |
|---|---|---|---|
| 7,704,181 B2 * | 4/2010 | Phillips et al. ............. | 475/275 |
| 7,988,586 B2 * | 8/2011 | Phillips et al. ............. | 475/275 |
| 8,007,394 B2 * | 8/2011 | Phillips et al. ............. | 475/275 |
| 8,033,948 B2 * | 10/2011 | Phillips et al. ............. | 475/275 |
| 2006/0142112 A1 * | 6/2006 | Kamada et al. ............. | 475/275 |
| 2009/0011891 A1 * | 1/2009 | Phillips et al. ............. | 475/275 |
| 2009/0036253 A1 * | 2/2009 | Phillips et al. ............. | 475/275 |
| 2009/0124448 A1 * | 5/2009 | Wittkopp et al. ............. | 475/275 |
| 2009/0192010 A1 * | 7/2009 | Wittkopp et al. ............. | 475/275 |
| 2010/0144486 A1 * | 6/2010 | Hart et al. ............. | 475/275 |
| 2010/0190600 A1 * | 7/2010 | Phillips et al. ............. | 475/275 |
| 2010/0210392 A1 * | 8/2010 | Hart et al. ............. | 475/275 |
| 2010/0210393 A1 * | 8/2010 | Phillips et al. ............. | 475/275 |
| 2010/0210395 A1 * | 8/2010 | Phillips et al. ............. | 475/275 |
| 2010/0210396 A1 * | 8/2010 | Wittkopp et al. ............. | 475/275 |
| 2010/0210401 A1 * | 8/2010 | Phillips et al. ............. | 475/275 |
| 2010/0210402 A1 * | 8/2010 | Phillips et al. ............. | 475/275 |
| 2010/0210403 A1 * | 8/2010 | Wittkopp et al. ............. | 475/275 |
| 2010/0216588 A1 * | 8/2010 | Wittkopp et al. ............. | 475/275 |
| 2010/0227729 A1 * | 9/2010 | Wittkopp et al. ............. | 475/275 |
| 2010/0279814 A1 * | 11/2010 | Brehmer et al. ............. | 475/275 |

* cited by examiner

*Primary Examiner* — Sherry Estremsky
(74) *Attorney, Agent, or Firm* — Morgan, Lewis & Bockius LLP

(57) ABSTRACT

A gear train of an automatic transmission for vehicles which achieving at least ten forward speeds and one reverse speed, may include an input shaft receiving torque of an engine which may be driving source, an output gear outputting a changed torque, first, second, third, and fourth planetary gear sets respectively having first, second, third, and fourth sun gears, first, second, third, and fourth planet carriers, and first, second, third, and fourth ring gears as rotation elements thereof, eight rotation shafts formed by connecting one rotation element to other rotation element, the input shaft, or the output gear, or being the rotation element, and friction members provided with first, second, third, and fourth clutches disposed between selected rotation shafts and controls delivery of the torque therebetween and first and second brakes selectively connecting selected rotation shaft to a transmission housing.

8 Claims, 14 Drawing Sheets

FIG.2

| | C1 | C2 | C3 | C4 | B1 | B2 | gear ratio |
|---|---|---|---|---|---|---|---|
| D1 | | | ● | | ● | ● | 4.700 |
| D2 | | ● | | | ● | ● | 3.133 |
| D3 | | ● | ● | | ● | | 1.340 |
| D4 | ● | ● | | | ● | | 1.159 |
| D5 | ● | | ● | | ● | | 1.072 |
| D6 | | | ● | ● | ● | | 1.059 |
| D7 | | ● | ● | ● | | | 1.000 |
| D8 | | | ● | ● | | ● | 0.869 |
| D9 | ● | | ● | | | ● | 0.839 |
| D10 | ● | ● | | | | ● | 0.667 |
| REV | ● | | | | ● | ● | -3.280 |

GEAR TRAIN OF AUTOMATIC TRANSMISSION FOR VEHICLES

CROSS-REFERENCE TO RELATED APPLICATION

The present application claims priority to Korean Patent Application No. 10-2010-0063167 filed in the Korean Intellectual Property Office on Jun. 30, 2010, the entire contents of which is incorporated herein for all purposes by this reference.

BACKGROUND OF THE INVENTION

1. Field of the Invention

The present invention relates to a gear train of an automatic transmission for vehicles which achieves at least ten forward speeds and one reverse speed by combining four simple planetary gear sets with four clutches and two brakes such that power delivery performance is improved and fuel consumption is reduced.

2. Description of Related Art

A typical shift mechanism of an automatic transmission utilizes a combination of a plurality of planetary gear sets. A gear train of such an automatic transmission that includes the plurality of planetary gear sets changes rotational speed and torque received from a torque converter of the automatic transmission, and accordingly transmits the changed torque to an output shaft.

It is well known that when a transmission realizes a greater number of shift speeds, speed ratios of the transmission can be more optimally designed, and therefore a vehicle can have economical fuel mileage and better performance. For that reason, an automatic transmission that is able to realize more shift speeds is under continuous investigation.

In addition, with the same number of speeds, features of a gear train, such as durability, efficiency in power transmission, and size, substantially depend on the layout of the combined planetary gear sets. Therefore, designs for a combining structure of a gear train are also under continuous investigation.

A manual transmission that has too many speeds causes inconvenience to a driver. Therefore, the advantageous features of having more shift-speeds are more important in an automatic transmission because an automatic transmission automatically controls the shifting operations.

Currently, four-speed and five-speed automatic transmissions are most often found on the market. However, six-speed automatic transmissions have also been realized for enhancement of performance of power transmission and for enhanced fuel mileage of a vehicle. In addition, seven-speed automatic transmissions and eight-speed automatic transmissions have been developed at a good pace.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a gear train of an automatic transmission for vehicles having advantages of simplifying structures of the automatic transmission and improving power delivery performance and fuel economy as a consequence of realizing at least ten forward speeds and one reverse speed by combining four simple planetary gear sets with four clutches and two brakes.

A gear train of an automatic transmission for vehicles according to exemplary embodiments of the present invention may achieve at least ten forward speeds and one reverse speed. The gear train may include an input shaft receiving torque of an engine which may be driving source, an output gear outputting changed torque, first, second, third, and fourth planetary gear sets respectively having first, second, third, and fourth sun gears, first, second, third, and fourth planet carriers, and first, second, third, and fourth ring gears as rotation elements thereof, eight rotation shafts formed by connecting one rotation element to other rotation element, the input shaft, or the output gear, or being the rotation element, and friction members provided with first, second, third, and fourth clutches disposed between selected rotation shafts and controls delivery of the torque therebetween and first and second brakes selectively connecting selected rotation shaft to a transmission housing.

The eight rotation shafts may include a first rotation shaft directly connecting the input shaft with the second planet carrier, a second rotation shaft directly connecting the output gear with the third planet carrier, a third rotation shaft directly connecting the first planet carrier with the second sun gear, a fourth rotation shaft being the first sun gear, a fifth rotation shaft directly connecting the third sun gear with the fourth ring gear, a sixth rotation shaft directly connecting the first ring gear with the third ring gear, a seventh rotation shaft directly connecting the second ring gear with the fourth sun gear, and an eighth rotation shaft being the fourth planet carrier.

The friction members may include the first clutch selectively connecting the second rotation shaft with the eighth rotation shaft, the second clutch selectively connecting the seventh rotation shaft with the eighth rotation shaft, the third clutch selectively connecting the first rotation shaft with the fifth rotation shaft, the fourth clutch selectively connecting the sixth rotation shaft with the eighth rotation shaft, the first brake selectively connecting the fourth rotation shaft with the transmission housing, and the second brake selectively connecting the third rotation shaft with the transmission housing.

According to the first exemplary embodiment, the first planetary gear set may be disposed close to the engine and the second, third, and fourth planetary gear sets may be sequentially disposed at the rear of the first planetary gear set.

The first and second brakes may be disposed at the front of the first planetary gear set, the first and fourth clutches may be disposed between the second and third planetary gear sets, and the second and third clutches may be disposed at the rear of the fourth planetary gear set.

The first planetary gear set may be a double pinion planetary gear set, and the second, third, and fourth planetary gear sets may be single pinion planetary gear sets.

The third clutch and the first and second brakes may be operated at a first forward speed, the second clutch and the first and second brakes may be operated at a second forward speed, the second and third clutches and the first brake may be operated at a third forward speed, the first and second clutches and the first brake may be operated at a fourth forward speed, the first and third clutches and the first brake may be operated at a fifth forward speed, the third and fourth clutches and the first brake may be operated at a sixth forward speed, the second, third, and fourth clutches may be operated at a seventh forward speed, the third and fourth clutches and the second brake may be operated at an eighth forward speed, the first and third clutches and the second brake may be operated at a ninth forward speed, the first and second clutches and the second brake may be operated at a tenth forward speed, and the first clutch and the first and second brakes may be operated at a reverse speed.

According to the second exemplary embodiment, the first planetary gear set may be disposed close to the engine and the third, fourth, and second planetary gear sets may be sequentially disposed at the rear of the first planetary gear set.

The first and second brakes may be disposed at the front of the first planetary gear set, the first and fourth clutches may be disposed between the first and third planetary gear sets, and the second and third clutches may be disposed between the fourth and second planetary gear sets.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 2 is an operational chart for a gear train according to the first exemplary embodiment of the present invention.

Figure 1:
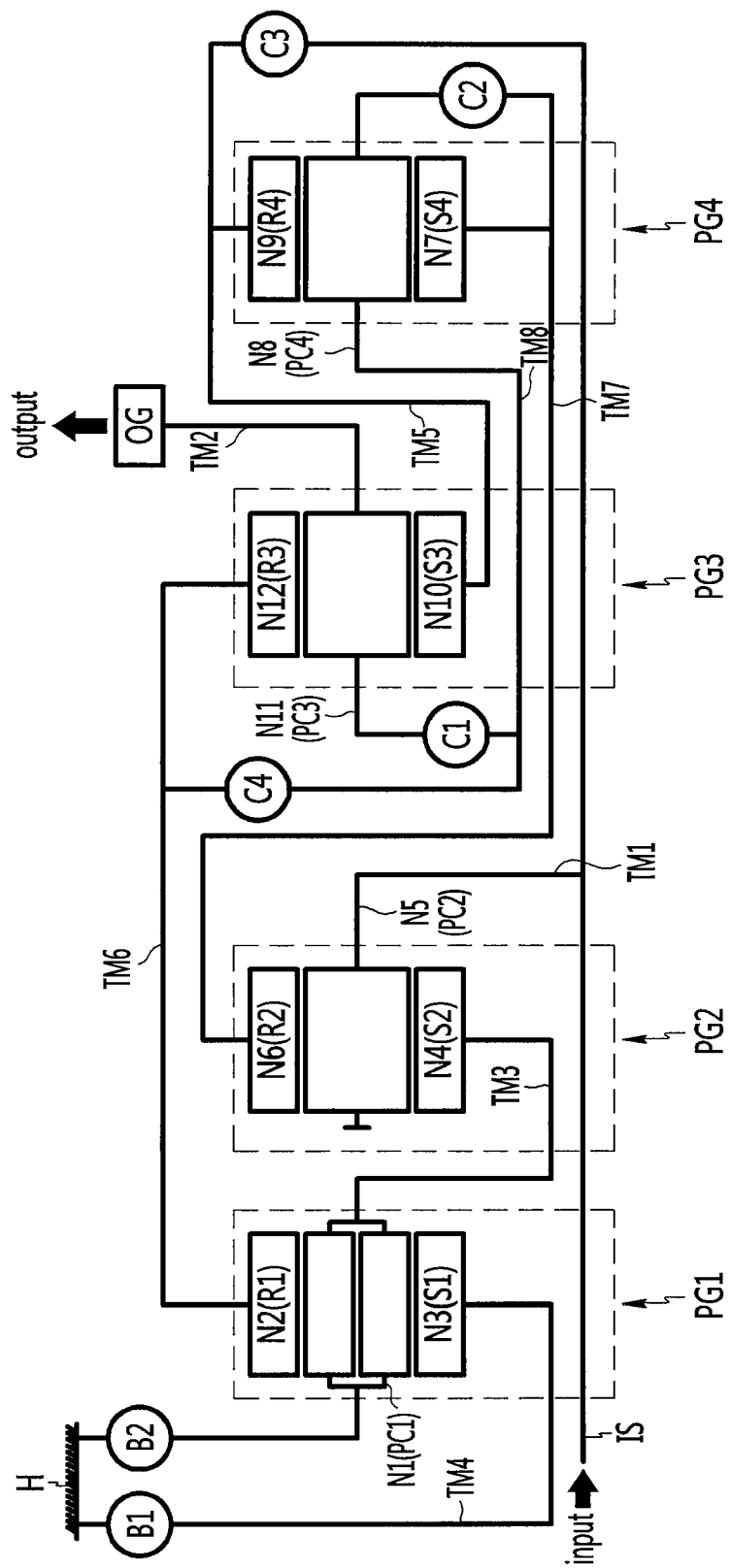
FIG. 1 is a schematic diagram of a gear train according to the first exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Description of components that are not necessary for explaining the present invention will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a gear train according to the first exemplary embodiment of the present invention. A gear train according to the first exemplary embodiment of the present invention includes first, second, third, and fourth planetary gear sets PG1, PG2, PG3, and PG4 disposed on the same axis, clutch means including four clutches C1, C2, C3, and C4, and brake means including two brakes B1 and B2.

Accordingly, a rotational speed input from an input shaft IS is changed by the first, second, third, and fourth planetary gear sets PG1, PG2, PG3, and PG4 and is output through an output gear OG. The first planetary gear set PG1 is disposed close to an engine, and the second, third, and fourth planetary gear sets PG2, PG3, and PG4 are sequentially dispose at the rear of the first planetary gear set PG1.

The input shaft IS is an input member and denotes a turbine shaft of a torque converter. Torque transmitted from a crankshaft of the engine is converted by the torque converter and is input to the gear train through the input shaft IS. The output gear OG is an output member and is connected to a well-known differential apparatus so as to transmit an output of the gear train to driving wheels.

The first planetary gear set PG1 is a double pinion planetary gear set, and has three rotation elements including a sun gear, a planet carrier, and a ring gear. For better comprehension and ease of description, the sun gear is indicated by a first sun gear S1, the planet carrier is indicated by a first planet carrier PC1, and the ring gear is indicated by a first ring gear R1.

The second planetary gear set PG2 is a single pinion planetary gear set, and has three rotation elements including a sun gear, a planet carrier, and a ring gear. For better comprehension and ease of description, the sun gear is indicated by a second sun gear S2, the planet carrier is indicated by a second planet carrier PC2, and the ring gear is indicated by a second ring gear R2.

The third planetary gear set PG3 is a single pinion planetary gear set, and has three rotation elements including a sun gear, a planet carrier, and a ring gear. For better comprehension and ease of description, the sun gear is indicated by a third sun gear S3, the planet carrier is indicated by a third planet carrier PC3, and the ring gear is indicated by a third ring gear R3.

The fourth planetary gear set PG4 is a single pinion planetary gear set, and has three rotation elements including a sun gear, a planet carrier, and a ring gear. For better comprehension and ease of description, the sun gear is indicated by a fourth sun gear S4, the planet carrier is indicated by a fourth planet carrier PC4, and the ring gear is indicated by a fourth ring gear R4.

The rotation elements of the first, second, third, and fourth planetary gear sets PG1, PG2, PG3, and PG4 are connected such that one rotation element of the first planetary gear set PG1 is connected to one rotation element of the second planetary gear set PG2, another rotation element of the second planetary gear set PG2 is connected to one rotation element of the fourth planetary gear set PG4, one rotation element of the third planetary gear set PG3 is connected to another rotation element of the fourth planetary gear set PG4, and another rotation element of the third planetary gear set PG3 is connected to another rotation element of the first planetary gear set PG1. Therefore, eight rotation shafts TM1-TM8 are included.

In further detail, the first rotation shaft TM1 directly connects the input shaft IS with the second planet carrier PC2.

The second rotation shaft TM2 directly connects the output gear OG with the third planet carrier PC3.

The third rotation shaft TM3 directly connects the first planet carrier PC1 with the second sun gear S2.

The fourth rotation shaft TM4 is the first sun gear S1.

The fifth rotation shaft TM5 directly connects the third sun gear S3 with the fourth ring gear R4.

The sixth rotation shaft TM6 directly connects the first ring gear R1 with the third ring gear R3.

The seventh rotation shaft TM7 directly connects the second ring gear R2 with the fourth sun gear S4.

The eighth rotation shaft TM8 is the fourth planet carrier PC4.

A friction member C1 is the first clutch, and selectively connects the second rotation shaft TM2 with the eighth rotation shaft TM8 so as to transmit torque therebetween.

A friction member C2 is the second clutch, and selectively connects the seventh rotation shaft TM7 with the eighth rotation shaft TM8 so as to transmit torque therebetween.

A friction member C3 is the third clutch, and selectively connects the first rotation shaft TM1 with the fifth rotation shaft TM5 so as to transmit torque therebetween.

A friction member C4 is the fourth clutch, and selectively connects the sixth rotation shaft TM6 with the eighth rotation shaft TM8 so as to transmit torque therebetween.

A friction member B1 is the first brake, and selectively connects the fourth rotation shaft TM4 with a transmission housing H such that the fourth rotation shaft TM4 is operated as a selective fixed element.

A friction member B2 is the second brake, and selectively connects the third rotation shaft TM3 with the transmission housing H such that the third rotation shaft TM3 is operated as a selective fixed element.

Friction members including the first, second, third, and fourth clutches C1, C2, C3, and C4 and the first and second brakes B1 and B2 are conventional multi-plate friction elements of wet type that are operated by hydraulic pressure.

In addition, the first and second brakes B1 and B2 are disposed at an external circumferential portion of the front of the first planetary gear set PG1, the fourth and first clutches C4 and C1 are disposed between the second and third planetary gear sets PG2 and PG3, and the second and third clutches C2 and C3 are disposed at the rear of the fourth planetary gear set PG4.

If the friction members are dispersed as described above, formation of hydraulic lines for supplying hydraulic pressure to such friction members may be simplified, and weight balance in the automatic transmission may be enhanced.

FIG. 2 is an operational chart for a gear train according to the first exemplary embodiment of the present invention. That is, FIG. 2 shows which clutches and brakes are operated at each shift-speed. As shown in FIG. 2, three friction members are operated at each shift-speed according to the first exemplary embodiment of the present invention.

That is, the third clutch C3 and the first and second brakes B1 and B2 are operated at a first forward speed D1, the second clutch C2 and the first and second brakes B1 and B2 are operated at a second forward speed D2, the second and third clutches C2 and C3 and the first brake B1 are operated at a third forward speed D3, the first and second clutches C1 and C2 and the first brake B1 are operated at a fourth forward speed D4, the first and third clutches C1 and C3 and the first brake B1 are operated at a fifth forward speed D5, the third and fourth clutches C3 and C4 and the first brake B1 are operated at a sixth forward speed D6, the second, third, and fourth clutches C2, C3, and C4 are operated at a seventh forward speed D7, the third and fourth clutches C3 and C4 and the second brake B2 are operated at an eighth forward speed D8, the first and third clutches C1 and C3 and the second brake B2 are operated at a ninth forward speed D9, the first and second clutches C1 and C2 and the second brake B2 are operated at a tenth forward speed D10, and the first clutch C1 and the first and second brakes B1 and B2 are operated at a reverse speed REV.

FIG. 3 to FIG. 13 are lever diagrams for a gear train according to the first exemplary embodiment of the present invention. In the drawings, a lower horizontal line represents a rotational speed is "0", and an upper horizontal line represents a rotational speed is "1.0", that is, the rotational speed thereof is the same as that of the input shaft IS.

Three vertical lines of the first planetary gear set PG1 sequentially represent a first rotation element N1 to a third rotation element N3 from the left to the right, and distances therebetween are set according to a gear ratio (teeth number of the sun gear/teeth number of the ring gear) of the first planetary gear set PG1. The first planet carrier PC1 is set as the first rotation element N1, the first ring gear R1 is set as the second rotation element N2, and the first sun gear S1 is set as the third rotation element N3.

Three vertical lines of the second planetary gear set PG2 sequentially represent a fourth rotation element N4 to a sixth rotation element N6 from the left to the right, and distances therebetween are set according to a gear ratio (teeth number of the sun gear/teeth number of the ring gear) of the second planetary gear set PG2. The second sun gear S2 is set as the fourth rotation element N4, the second planet carrier PC2 is set as the fifth rotation element N5, and the second ring gear R2 is set as the sixth rotation element N6.

Three vertical lines of the fourth planetary gear set PG4 sequentially represent a seventh rotation element N7 to a ninth rotation element N9 from the left to the right, and distances therebetween are set according to a gear ratio (teeth number of the sun gear/teeth number of the ring gear) of the fourth planetary gear set PG4. The fourth sun gear S4 is set as the seventh rotation element N7, the fourth planet carrier PC4 is set as the eighth rotation element N8, the fourth ring gear R4 is set as the ninth rotation element N9.

Three vertical lines of the third planetary gear set PG3 sequentially represent a tenth rotation element N10 to a twelfth rotation element N12 from the left to the right, and distances therebetween are set according to a gear ratio (teeth number of the sun gear/teeth number of the ring gear) of the third planetary gear set PG3. The third sun gear S3 is set as the tenth rotation element N10, the third planet carrier PC3 is set as the eleventh rotation element N11, the third ring gear R3 is set as the twelfth rotation element N12.

[First Forward Speed]

As shown in FIG. 2, the third clutch C3 and the first and second brakes B1 and B2 are operate at the first forward speed D1.

Figure 3:
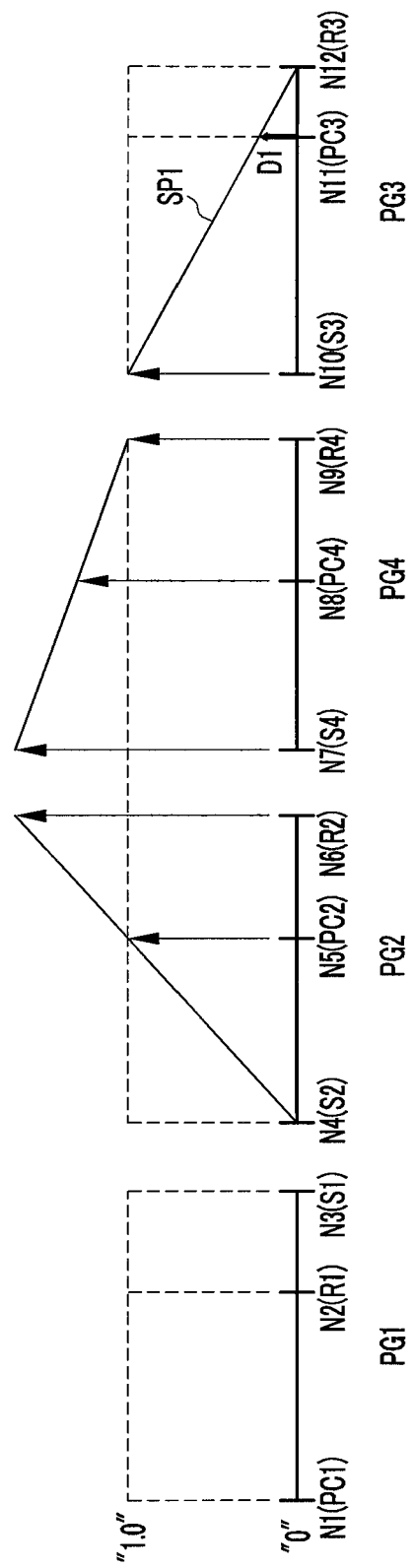
FIG. 3 is a lever diagram for a gear train according to the first exemplary embodiment of the present invention at the first forward speed.

As shown in FIG. 3, in a state that a rotation speed of the input shaft IS is input to the fifth rotation element N5, all the rotation elements of the first planetary gear set PG1 are stopped by operations of the first and second brakes B1 and B2 and the fourth rotation element N4 directly connected to the first rotation element N1 is operated as a fixed element. Accordingly, the sixth rotation element N6 outputs an increased rotation speed.

In addition, the rotation speed of the input shaft IS is transmitted to the ninth rotation element N9 and the tenth rotation element N10 by operation of the third clutch C3, and the rotation speed of the sixth rotation element N6 is transmitted to the seventh rotation element N7 directly connected thereto.

At this state, the twelfth rotation element N12 directly connected to the second rotation element N2 is operated as the fixed element. Therefore, a first shift line SP1 connecting the tenth rotation element N10 and the twelfth rotation element N12 is formed and the first forward speed D1 is output through the eleventh rotation element N11 that is the output member.

[Second Forward Speed]

As shown in FIG. 2, the third clutch C3 that was operated at the first forward speed D1 is released and the second clutch C2 is operated at the second forward speed D2.

Figure 4:
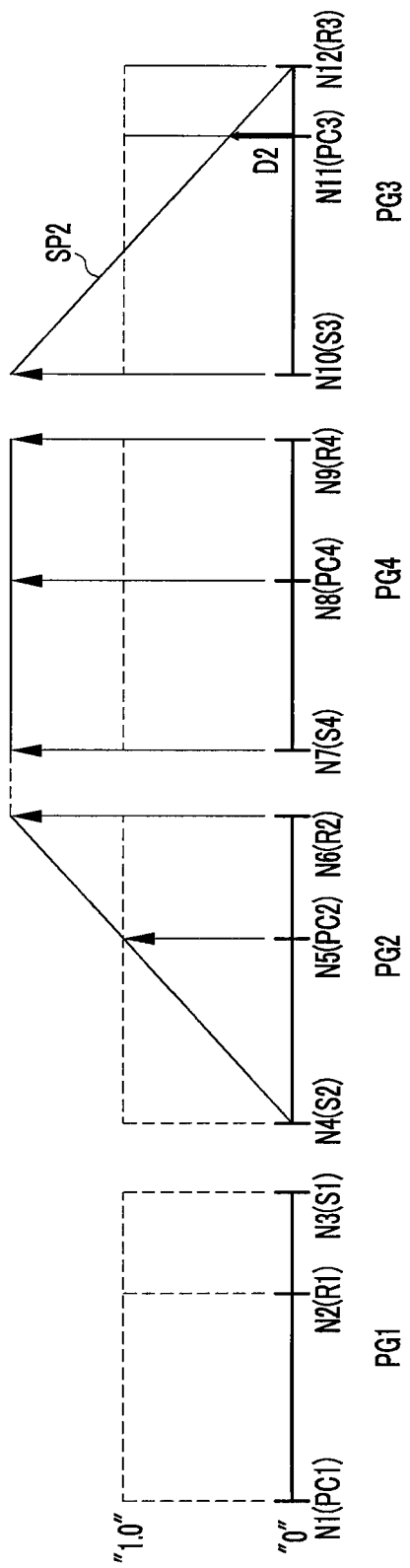
FIG. 4 is a lever diagram for a gear train according to the first exemplary embodiment of the present invention at the second forward speed.

As shown in FIG. 4, the fourth rotation element N4 is operated as the fixed element and the rotation speed of the input shaft IS is input to the fifth rotation element N5. Therefore, the sixth rotation element N6 outputs an increased rotation speed and the increased rotation speed is transmitted to the seventh rotation element N7.

At this state, the fourth planetary gear set PG4 becomes direct-coupling state by operation of the second clutch C2. The increased rotation speed is transmitted to the tenth rotation element N10 directly connected to the ninth rotation element N9, and the twelfth rotation element N12 directly connected to the second rotation element N2 is operated as the fixed element. Therefore, a second shift line SP2 connecting the tenth rotation element N10 and the twelfth rotation element N12 is formed and the second forward speed D2 is output through the eleventh rotation element N11 that is the output member.

[Third Forward Speed]

As shown in FIG. 2, the second brake B2 that was operated at the second forward speed D2 is released and the third clutch C3 is operated at the third forward speed D3.

Figure 5:
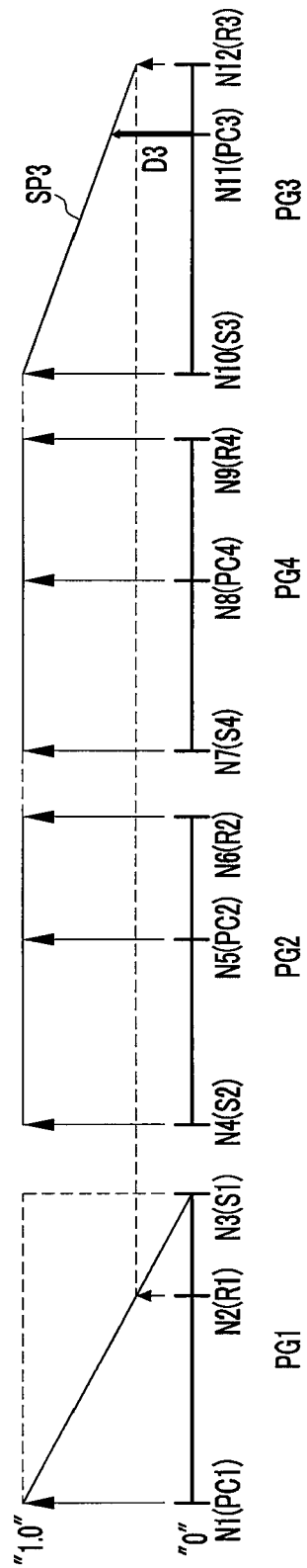
FIG. 5 is a lever diagram for a gear train according to the first exemplary embodiment of the present invention at the third forward speed.

As shown in FIG. 5, the rotation speed of the input shaft IS is transmitted to the ninth rotation element N9 and the tenth rotation element N10 by operation of the third clutch C3.

At this time, the fourth planetary gear set PG4 becomes direct-coupling state by operation of the second clutch C2. Since the fifth rotation element N5 and the sixth rotation element N6 are respectively connected to the seventh rotation element N7 and the ninth rotation element N9 of the fourth planetary gear set PG4, the second planetary gear set PG2 also becomes direct-coupling state.

At this state, since torque of the fourth rotation element N4 is transmitted to the first rotation element N1 and the third rotation element N3 is operated as the fixed element by operation of the first brake B1, the second rotation element N2 outputs a reduced rotation speed.

In addition, in a state that the reduced rotation speed of the second rotation element N2 is input to the twelfth rotation element N12, the rotation speed of the input shaft IS is input to the tenth rotation element N10. Therefore, a third shift line SP3 connecting the tenth rotation element N10 and the twelfth rotation element N12 is formed and the third forward speed D3 is output through the eleventh rotation element N11 that is the output member.

[Fourth Forward Speed]

As shown in FIG. 2, the third clutch C3 that was operated at the third forward speed D3 is released and the first clutch C1 is operated at the fourth forward speed D4.

Figure 6:
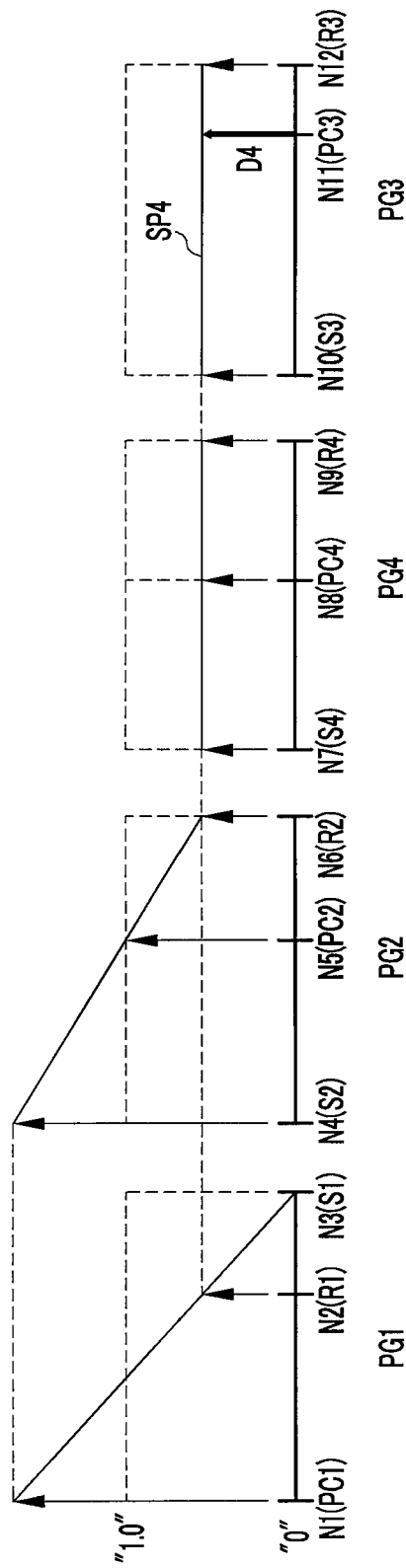
FIG. 6 is a lever diagram for a gear train according to the first exemplary embodiment of the present invention at the fourth forward speed.

As shown in FIG. 6, the fourth planetary gear set PG4 becomes direct-coupling state by operation of the second clutch C2. In addition, since the eighth rotation element N8 and the ninth rotation element N9 are respectively connected to the eleventh rotation element N11 and the tenth rotation element N10 of the third planetary gear set PG3 by operation of the first clutch C1, the third planetary gear set PG3 also becomes direct-coupling state.

At this state, the rotation speed of the input shaft IS is input to the fifth rotation element N5 and the third rotation element N3 is operated at the fixed element by operation of the first brake B1. Therefore, the fourth rotation element N4 and the first rotation element N1 output an increased rotation speed and the second rotation element N2 outputs a reduced rotation speed.

Since torque of the second rotation element N2 is transmitted to the twelfth rotation element N12 of the third planetary gear set PG3 being the direct-coupling state, a fourth shift line SP4 is formed and the fourth forward speed D4 is output through the eleventh rotation element N11.

[Fifth Forward Speed]

As shown in FIG. 3, the second clutch C2 that was operated at the fourth forward speed D4 is released and the third clutch C3 is operated at the fifth forward speed D5.

Figure 7:
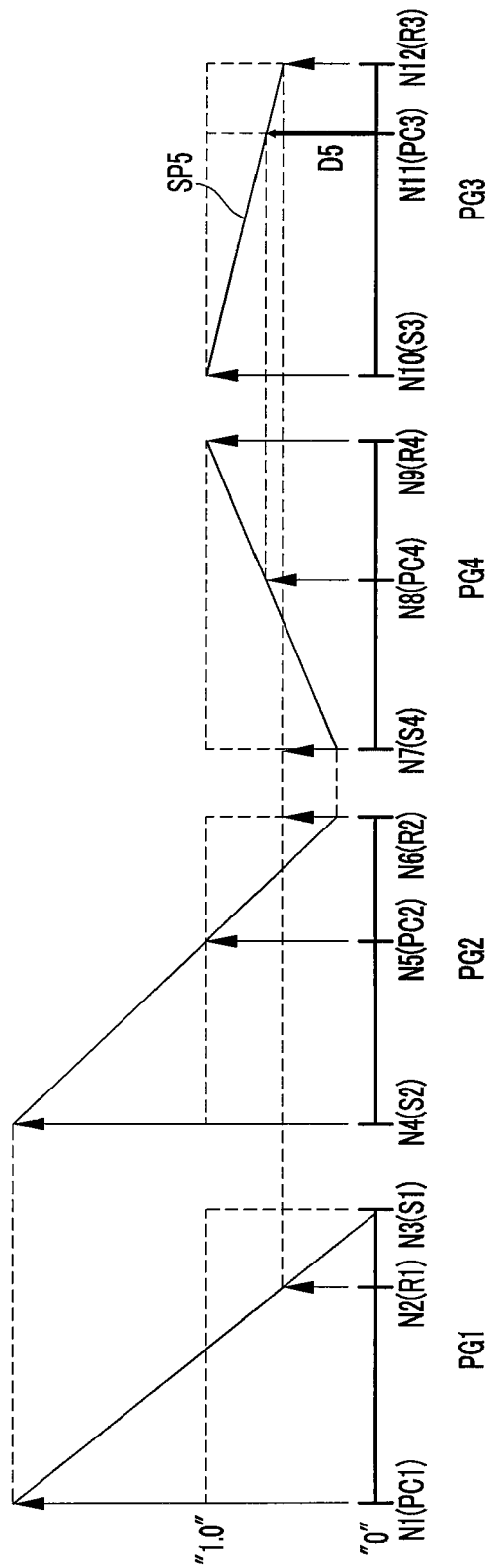
FIG. 7 is a lever diagram for a gear train according to the first exemplary embodiment of the present invention at the fifth forward speed.

As shown in FIG. 7, in a state that the rotation speed of the input shaft IS is input to the fifth rotation element N5, the third rotation element N3 is operated as the fixed element by operation of the first brake B1. In addition, the rotation speed of the input shaft IS is input to the ninth rotation element N9 and tenth rotation element N10 by operation of the third clutch C3.

At this state, the eleventh rotation element N11 and the eighth rotation element N8 rotate with the same rotation speed by operation of the first clutch C1. Therefore, a fifth shift line SP5 connecting the tenth rotation element N10 and the twelfth rotation element N12 is formed by interaction of the first, second, third, and fourth planetary gear sets PG1, PG2, PG3, and PG4 and the fifth forward speed D5 is output through the eleventh rotation element N11.

[Sixth Forward Speed]

As shown in FIG. 3, the first clutch C1 that was operated at the fifth forward speed D5 is released and the fourth clutch C4 is operated at the sixth forward speed D6.

Figure 8:
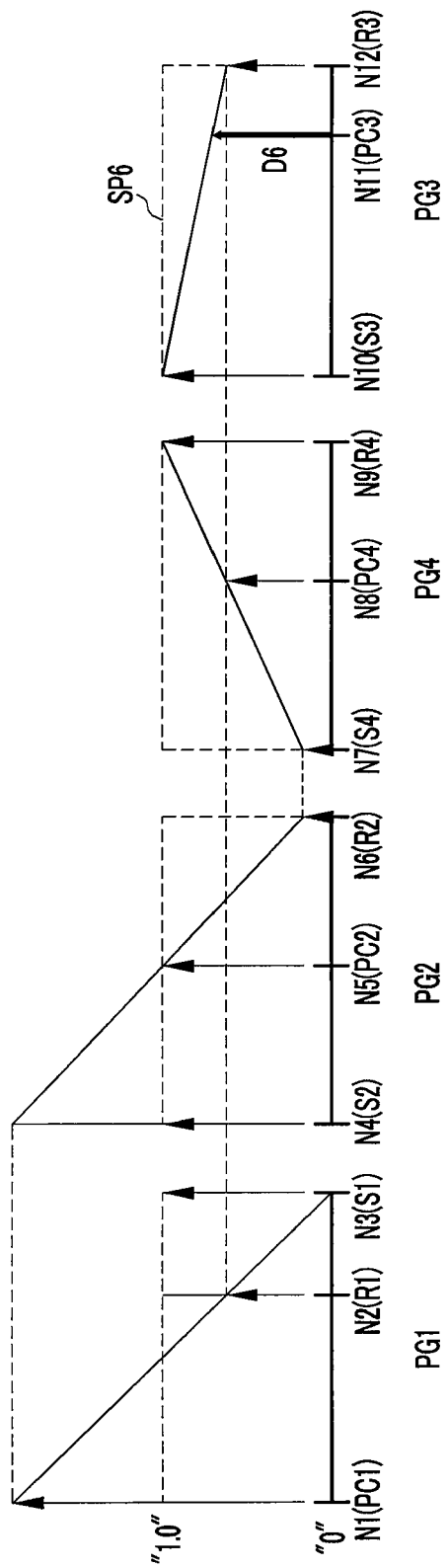
FIG. 8 is a lever diagram for a gear train according to the first exemplary embodiment of the present invention at the sixth forward speed.

As shown in FIG. 8, in a state that the rotation speed of the input shaft IS is input to the fifth rotation element N5, the third rotation element N3 is operated as the fixed element by operation of the first brake B1. Therefore, the fourth rotation element N4 and the first rotation element N1 output an increased rotation speed and the second rotation element N2 outputs a reduced rotation speed.

At this state, the rotation speed of the input shaft IS is transmitted to the ninth rotation element N9 and the tenth rotation element N10 by operation of the third clutch C3, and the reduced rotation speed of the second rotation element N2 is transmitted to the eighth rotation element N8 and the twelfth rotation element N12 by operation of the fourth clutch C4. Therefore, a sixth shift line SP6 connecting the tenth rotation element N10 and the twelfth rotation element N12 is formed and the sixth forward speed D6 is output through the eleventh rotation element N11.

[Seventh Forward Speed]

As shown in FIG. 2, the first brake B1 that was operated at the sixth forward speed D6 is released and the second clutch C2 is operated at the seventh forward speed D7.

Figure 9:
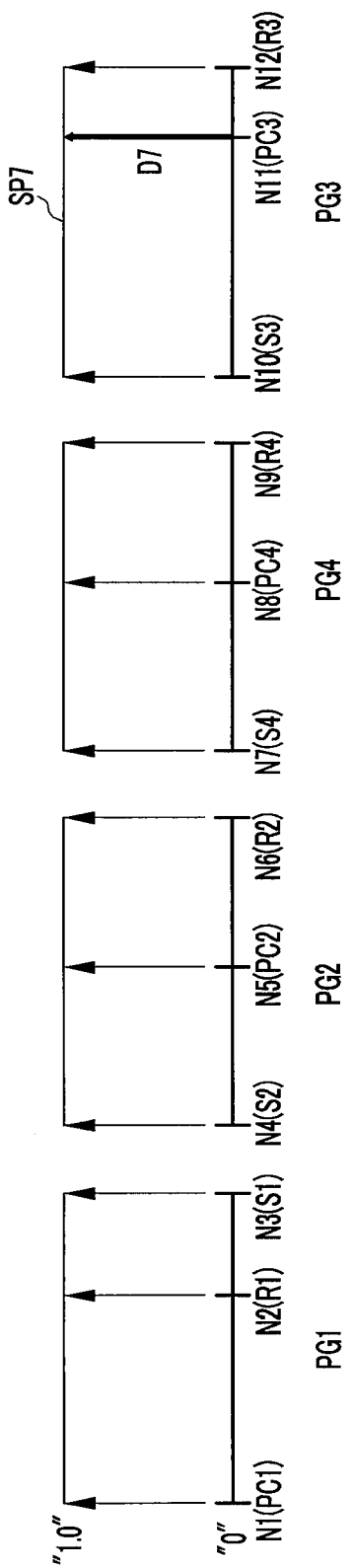
FIG. 9 is a lever diagram for a gear train according to the first exemplary embodiment of the present invention at the seventh forward speed.

As shown in FIG. 9, since three clutches C2, C3, and C4 are operated and the first, second, third, and fourth planetary gear sets PG1, PG2, PG3, and PG4 become direct-coupling state. Therefore, a seventh shift line SP7 is formed and the seventh forward speed D7 is output through the eleventh rotation element N11 that is the output member. The rotation speed of the seventh forward speed D7 is the same as that of the input shaft IS.

[Eighth Forward Speed]

As shown in FIG. 2, the second clutch C2 that was operated at the seventh forward speed D7 is released and the second brake B2 is operated at the eighth forward speed D8.

Figure 10:
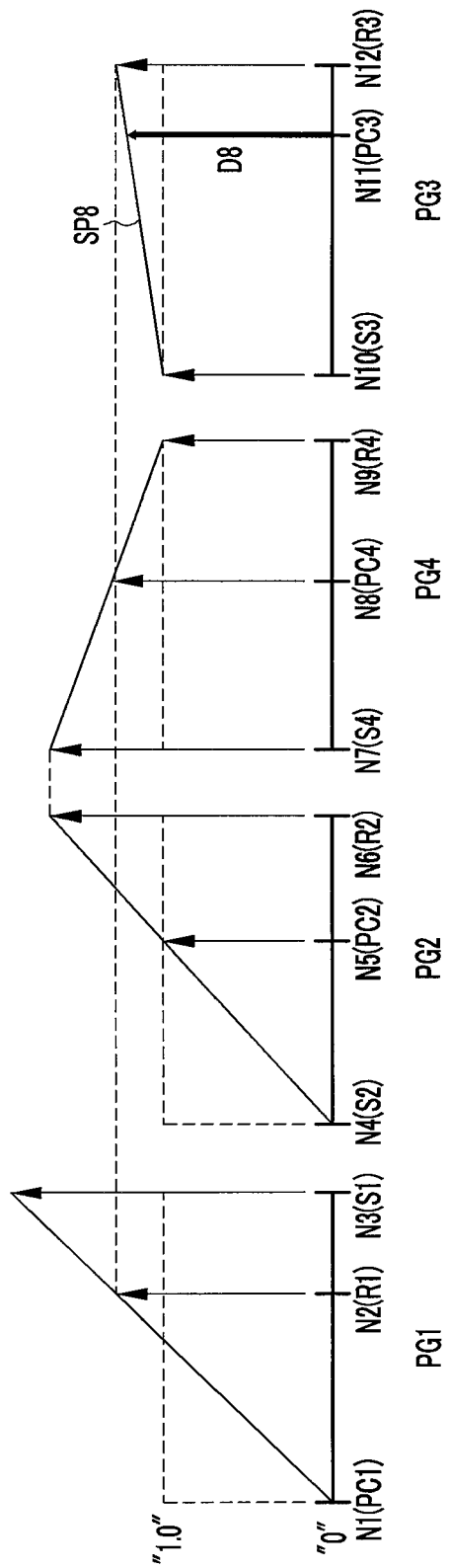
FIG. 10 is a lever diagram for a gear train according to the first exemplary embodiment of the present invention at the eighth forward speed.

As shown in FIG. 10, in a state that the first rotation element N1 and the fourth rotation element N4 are operated as the fixed elements by operation of the second brake B2, the rotation speed of the input shaft IS is input to the fifth rotation element N5. Therefore, the second rotation element N2 outputs an increased rotation speed and the increased rotation speed is transmitted to the twelfth rotation element N12.

In addition, the rotation speed of the input shaft IS is input to the tenth rotation element N10 by operation of the third clutch C3. Therefore, an eighth shift line SP8 connecting the tenth rotation element N10 and the twelfth rotation element N12 is formed and the eighth forward speed D8 is output through the eleventh rotation element N11 that is the output member.

[Ninth Forward Speed]

As shown in FIG. 2, the fourth clutch C4 that was operated at the eighth forward speed D8 is released and the first clutch C1 is operated at the ninth forward speed D9.

Figure 11:
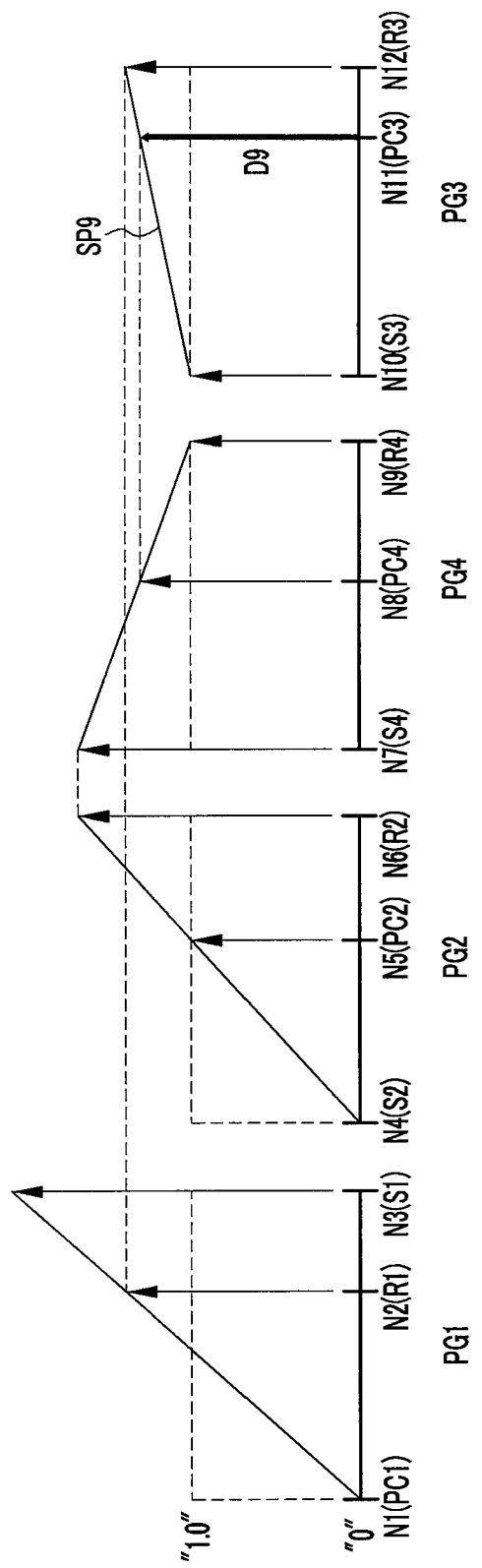
FIG. 11 is a lever diagram for a gear train according to the first exemplary embodiment of the present invention at the ninth forward speed.

As shown in FIG. 11, in a state that the first rotation element N1 and the fourth rotation element N4 are operated as the fixed elements by operation of the second brake B2, the rotation speed of the input shaft IS is input to the fifth rotation element N5. Therefore, the second rotation element N2 outputs an increased rotation speed and the increased rotation speed is transmitted to the twelfth rotation element N12.

In addition, the rotation speed of the input shaft IS is input to the tenth rotation element N10 by operation of the third clutch C3, and the eighth rotation element N8 is connected to the eleventh rotation element N11 by operation of the first clutch C1. Therefore, a ninth shift line SP9 connecting the tenth rotation element N10 and the twelfth rotation element N12 is formed and the ninth forward speed D9 is output through the eleventh rotation element N11 that is the output member.

[Tenth Forward Speed]

As shown in FIG. 2, the third clutch C3 that was operated at the ninth forward speed D9 is released and the second clutch C2 is operated at the tenth forward speed D10.

Figure 12:
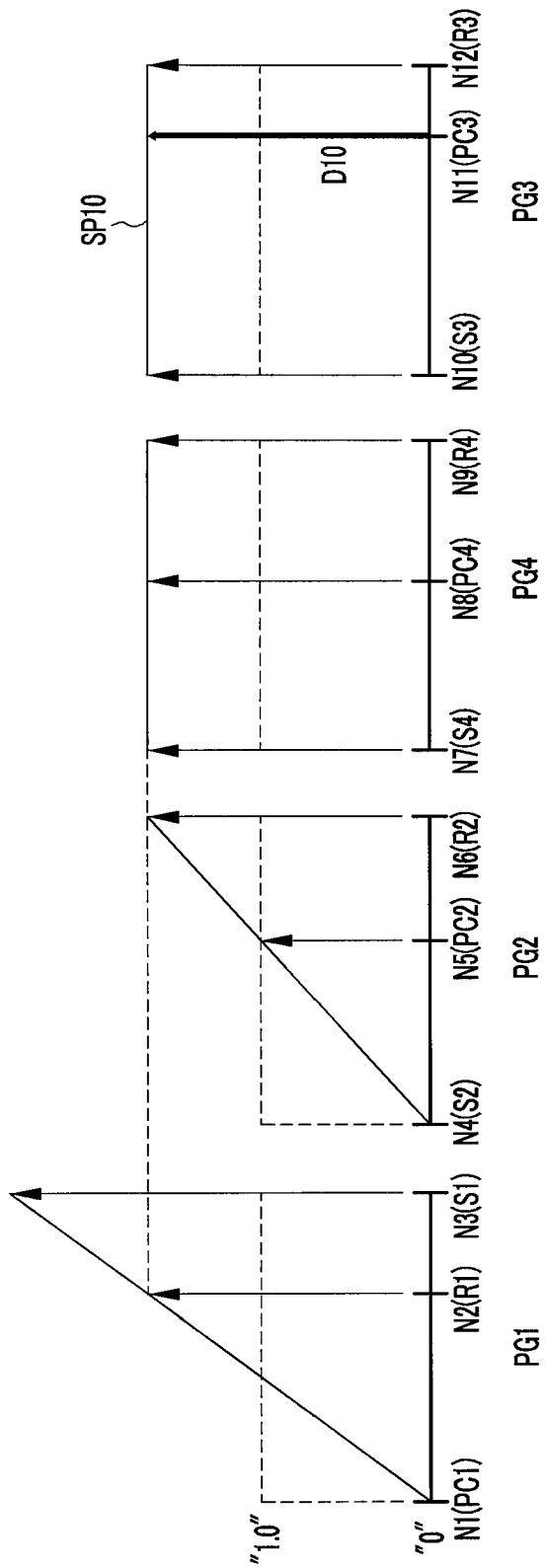
FIG. 12 is a lever diagram for a gear train according to the first exemplary embodiment of the present invention at the tenth forward speed.

As shown in FIG. 12, the fourth planetary gear set PG4 becomes direct-coupling state by operation of the second clutch C2, and the eighth rotation element N8 and the ninth rotation element N9 are respectively connected to the eleventh rotation element N11 and the tenth rotation element N10 of the third planetary gear set PG3 by operation of the first clutch C1. Therefore, the third planetary gear set PG3 also becomes direct-coupling state.

At this state, the rotation speed of the input shaft IS is input to the fifth rotation element N5 and the first rotation element N1 and the fourth rotation element N4 are operated as the fixed elements by operation of the second brake B2. Therefore, the second rotation element N2 outputs an increased rotation speed and the increased rotation speed is transmitted to the twelfth rotation element N12.

Accordingly, a tenth shift line SP10 is formed and the tenth forward speed D10 is output through the eleventh rotation element N11 that is the output member.

[Reverse Speed]

As shown in FIG. 2, the first clutch C1 and the first and second brakes B1 and B2 are operated at a reverse speed REV.

Figure 13:
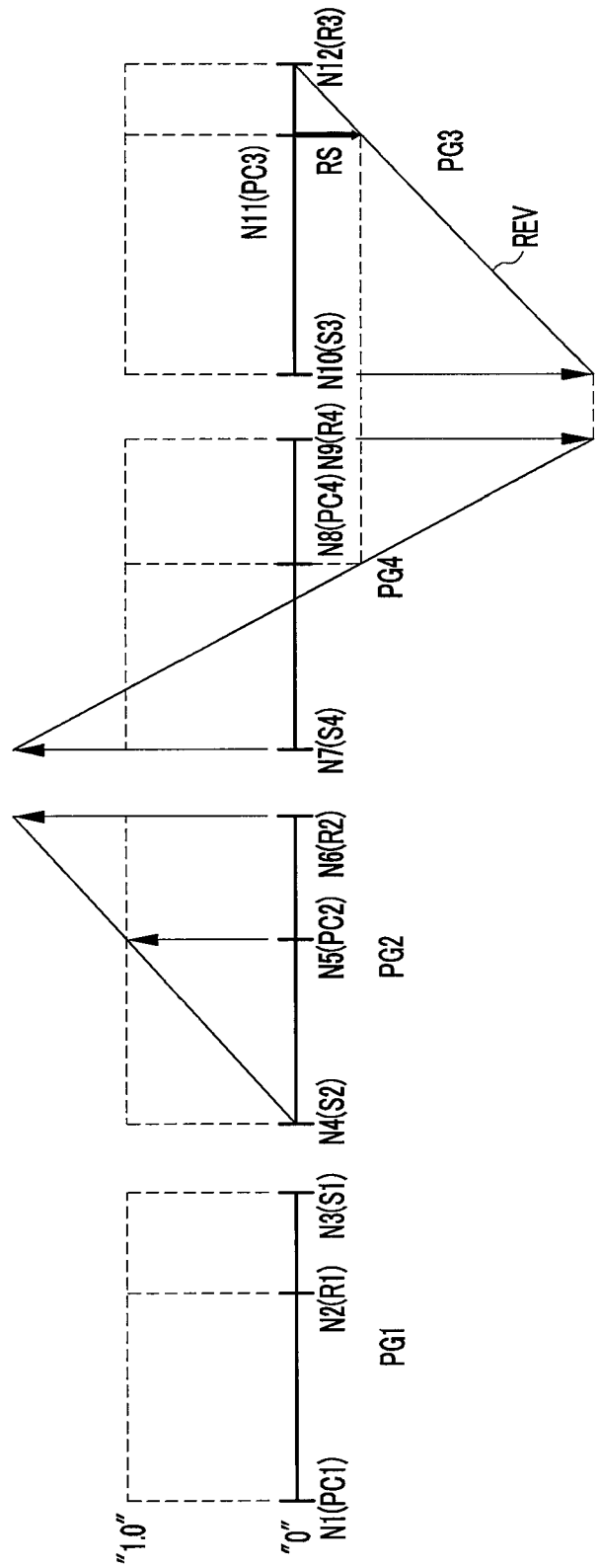
FIG. 13 is a lever diagram for a gear train according to the first exemplary embodiment of the present invention at the reverse speed.

As shown in FIG. 13, in a state that the rotation speed of the input shaft IS is input to the fifth rotation element N5, all the rotation elements of the first planetary gear set PG1 are stopped by operations of the first and second brakes B1 and B2. Therefore, the fourth rotation element N4 directly connected to the first planet carrier PC1 of the first rotation element N1 is operated as the fixed element.

Accordingly, an increased rotation speed of the sixth rotation element N6 is input to the seventh rotation element N7 and the twelfth rotation element N12 directly connected to the second rotation element N2 is operated as the fixed element. Therefore, a reverse shift line SR is formed and the reverse speed REV is output through the eleventh rotation element N11 that is the output member.

Figure 14:
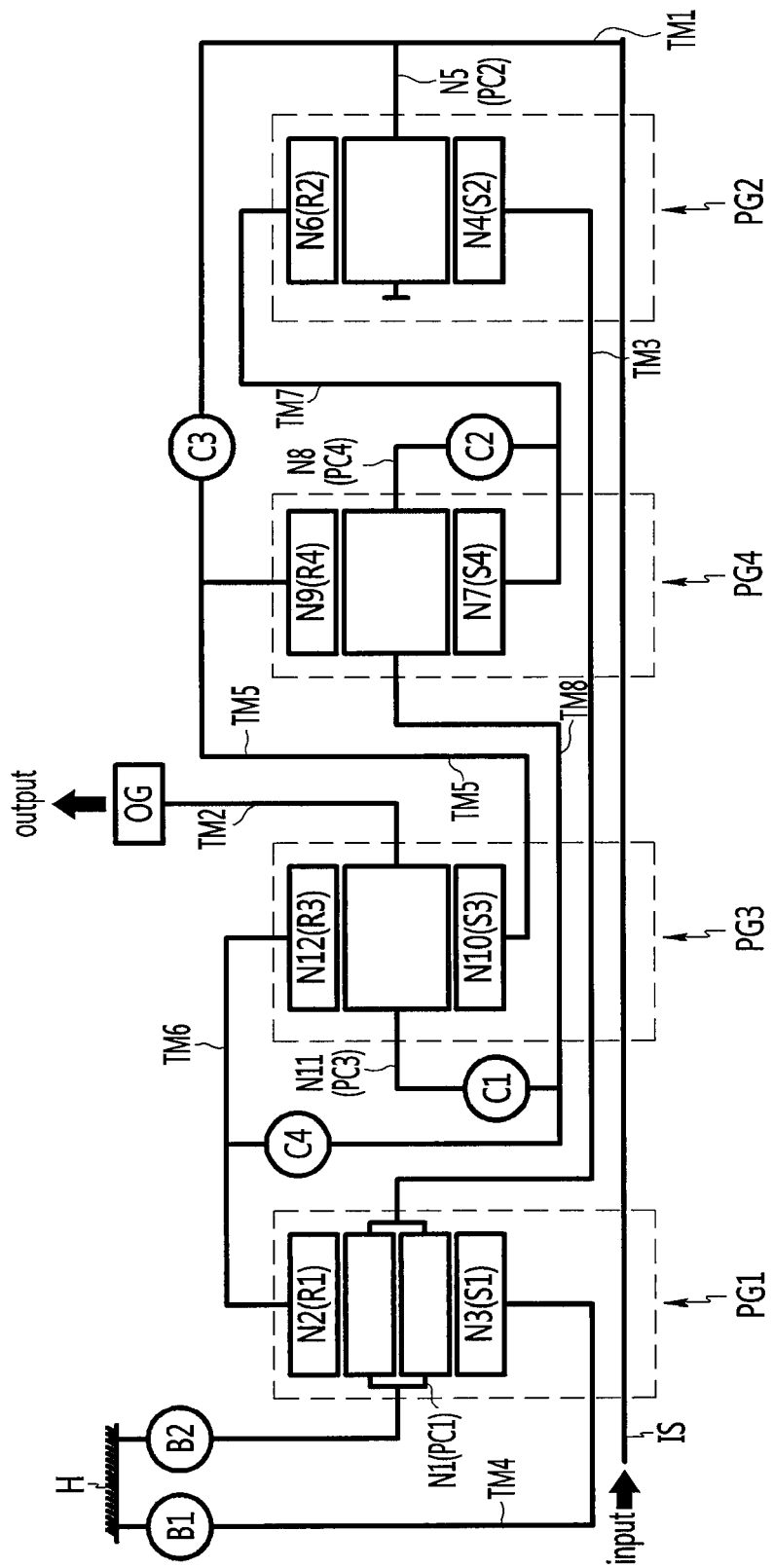
FIG. 14 is a schematic diagram of a gear train according to the second exemplary embodiment of the present invention.

FIG. 14 is a schematic diagram of a gear train according to the second exemplary embodiment of the present invention. Structures of the first, second, third, and fourth planetary gear sets PG1-PG4 according to the second exemplary embodiment are the same as those according to the first exemplary embodiment. However, positions of the first, second, third, and fourth planetary gear sets PG1-PG4 are changed.

That is, the first, second, third, and fourth planetary gear sets PG1-PG4 are sequentially disposed from the engine according to the first exemplary embodiment, but the first, third, fourth, and second planetary gear sets PG1, PG3, PG4, and PG2 are sequentially disposed from the engine according to the second exemplary embodiment.

Operations of the second exemplary embodiment is the same as those of the first exemplary embodiment, and detailed description thereof will be omitted.

As described above, ten forward speeds and one reverse speed are achieved by combining four simple planetary gear sets with four clutches and two brakes. Three friction elements are operated at each shift-speed. Therefore, power delivery performance and fuel economy may be improved.

Since the frictional members are dispersedly disposed, formation of hydraulic lines may be simplified, weight balance in an automatic transmission may be enhanced.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A gear train of an automatic transmission for vehicles achieving at least ten forward speeds and one reverse speed, comprising:
    an input shaft receiving torque of an engine which is driving source;
    an output gear outputting a changed torque;
    first, second, third, and fourth planetary gear sets respectively having first, second, third, and fourth sun gears, first, second, third, and fourth planet carriers, and first, second, third, and fourth ring gears as rotation elements thereof;
    eight rotation shafts each formed by connecting one rotation element to another rotation element, the input shaft, or the output gear, or being the rotation element; and
    friction members having first, second, third, and fourth clutches disposed between selected rotation shafts and controls delivery of the torque therebetween and first and second brakes selectively connecting selected rotation shafts to a transmission housing;
    wherein the eight rotation shafts comprises:
    a first rotation shaft directly connecting the input shaft with the second planet carrier;
    a second rotation shaft directly connecting the output gear with the third planet carrier;
    a third rotation shaft directly connecting the first planet carrier with the second sun gear;
    a fourth rotation shaft being the first sun gear;
    a fifth rotation shaft directly connecting the third sun gear with the fourth ring gear;
    a sixth rotation shaft directly connecting the first ring gear with the third ring gear;
    a seventh rotation shaft directly connecting the second ring gear with the fourth sun gear; and
    an eighth rotation shaft being the fourth planet carrier.

2. The gear train of claim 1, wherein the friction members comprises:
    the first clutch selectively connecting the second rotation shaft with the eighth rotation shaft;
    the second clutch selectively connecting the seventh rotation shaft with the eighth rotation shaft;
    the third clutch selectively connecting the first rotation shaft with the fifth rotation shaft;
    the fourth clutch selectively connecting the sixth rotation shaft with the eighth rotation shaft;
    the first brake selectively connecting the fourth rotation shaft with the transmission housing; and
    the second brake selectively connecting the third rotation shaft with the transmission housing.

3. The gear train of claim 1, wherein the first planetary gear set is disposed close to the engine and the second, third, and fourth planetary gear sets are sequentially disposed at the rear of the first planetary gear set.

4. The gear train of claim 3, wherein the first and second brakes are disposed at the front of the first planetary gear set, the first and fourth clutches are disposed between the second and third planetary gear sets, and the second and third clutches are disposed at the rear of the fourth planetary gear set.

5. The gear train of claim 1, wherein the first planetary gear set is a double pinion planetary gear set, and the second, third, and fourth planetary gear sets are single pinion planetary gear sets.

6. The gear train of claim 1, wherein the third clutch and the first and second brakes are operated at a first forward speed,
    the second clutch and the first and second brakes are operated at a second forward speed,
    the second and third clutches and the first brake are operated at a third forward speed,
    the first and second clutches and the first brake are operated at a fourth forward speed,
    the first and third clutches and the first brake are operated at a fifth forward speed,
    the third and fourth clutches and the first brake are operated at a sixth forward speed,
    the second, third, and fourth clutches are operated at a seventh forward speed,
    the third and fourth clutches and the second brake are operated at an eighth forward speed,
    the first and third clutches and the second brake are operated at a ninth forward speed,
    the first and second clutches and the second brake are operated at a tenth forward speed, and
    the first clutch and the first and second brakes are operated at a reverse speed.

7. The gear train of claim 1, wherein the first planetary gear set is disposed close to the engine and the third, fourth, and second planetary gear sets are sequentially disposed at the rear of the first planetary gear set.

8. The gear train of claim 7, wherein the first and second brakes are disposed at the front of the first planetary gear set, the first and fourth clutches are disposed between the first and third planetary gear sets, and the second and third clutches are disposed between the fourth and second planetary gear sets.

* * * * *